(12) United States Patent
Schimke et al.

(10) Patent No.: US 10,884,878 B2
(45) Date of Patent: Jan. 5, 2021

(54) MANAGING A POOL OF VIRTUAL FUNCTIONS

(71) Applicant: International Business Machines Corporation, Armonk, NY (US)

(72) Inventors: Timothy J. Schimke, Stewartville, MN (US); Prathima Kommineni, Hyderabad (IN); Amareswari Veguru, Hyderabad (IN); Jesse P. Arroyo, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 16/002,247

(22) Filed: Jun. 7, 2018

(65) Prior Publication Data

US 2019/0377646 A1   Dec. 12, 2019

(51) Int. Cl.
*G06F 11/14* (2006.01)
*G06F 9/50* (2006.01)
*G06F 9/455* (2018.01)

(52) U.S. Cl.
CPC ...... *G06F 11/1484* (2013.01); *G06F 9/45558* (2013.01); *G06F 9/5077* (2013.01); *G06F 2009/45579* (2013.01); *G06F 2009/45591* (2013.01); *G06F 2209/5011* (2013.01)

(58) Field of Classification Search
CPC ....... G06F 11/14; G06F 11/1484; G06F 9/455
USPC .......................................................... 714/3
See application file for complete search history.

(56) References Cited

U.S. PATENT DOCUMENTS

| 8,412,985 B1* | 4/2013 | Bowers | G06F 11/1666 714/42 |
| 8,881,141 B2* | 11/2014 | Koch | G06F 9/45558 718/1 |
| 9,092,297 B2 | 7/2015 | Armstrong et al. | |
| 9,569,244 B2 | 2/2017 | Challa et al. | |
| 2008/0148295 A1* | 6/2008 | Freimuth | G06F 9/4856 719/324 |
| 2008/0270720 A1* | 10/2008 | Tanabe | G06F 3/0605 711/162 |

(Continued)

OTHER PUBLICATIONS

Kutch et al., *SR-IOV for NFV Solutions, Practical Consideration and Thoughts*, Intel, Revision 1.0, 335625-001, dated Feb. 2017, 42 pages.

(Continued)

*Primary Examiner* — Kamini B Patel
(74) *Attorney, Agent, or Firm* — Peter Edwards

(57) ABSTRACT

Managing a pool of virtual functions including generating a virtual function pool comprising a plurality of virtual functions for at least one single root input/output virtualization (SR-IOV) adapter; creating a control path from a client virtual network interface controller (VNIC) driver in a first client partition to a target network using an active virtual function; receiving a failure alert indicating that the control path from the client VNIC driver in the first client partition to the target network using the active virtual function has failed; selecting, from the virtual function pool, a backup virtual function for the first client partition based on the failure alert; and recreating the control path from the client VNIC driver in the first client partition to the target network using the backup virtual function.

20 Claims, 9 Drawing Sheets

(56) References Cited

U.S. PATENT DOCUMENTS

| | | | | |
|---|---|---|---|---|
| 2011/0153917 | A1* | 6/2011 | Maita | G06F 1/3225 |
| | | | | 711/103 |
| 2012/0131232 | A1* | 5/2012 | Brownlow | G06F 13/4221 |
| | | | | 710/10 |
| 2012/0151472 | A1 | 6/2012 | Koch et al. | |
| 2012/0151473 | A1 | 6/2012 | Koch et al. | |
| 2012/0179844 | A1* | 7/2012 | Brownlow | G06F 9/5077 |
| | | | | 710/14 |
| 2012/0284437 | A1* | 11/2012 | Ayzenfeld | G06F 13/14 |
| | | | | 710/104 |
| 2012/0311260 | A1* | 12/2012 | Yamagiwa | H04L 41/085 |
| | | | | 711/117 |
| 2013/0024855 | A1* | 1/2013 | North | G06F 11/1484 |
| | | | | 718/1 |
| 2013/0160001 | A1* | 6/2013 | Graham | G06F 9/45558 |
| | | | | 718/1 |
| 2013/0160002 | A1* | 6/2013 | Graham | G06F 9/45558 |
| | | | | 718/1 |
| 2014/0250338 | A1* | 9/2014 | Prabhakaran | G06F 11/0757 |
| | | | | 714/56 |
| 2014/0372794 | A1* | 12/2014 | Graham | G06F 9/5077 |
| | | | | 714/15 |
| 2016/0019176 | A1* | 1/2016 | Challa | G06F 9/45558 |
| | | | | 710/117 |
| 2016/0077847 | A1* | 3/2016 | Hunter | G06F 13/20 |
| | | | | 718/1 |
| 2016/0077858 | A1* | 3/2016 | Hunter | G06F 9/45558 |
| | | | | 710/104 |
| 2016/0077884 | A1* | 3/2016 | Hunter | G06F 9/5077 |
| | | | | 718/104 |
| 2016/0132443 | A1* | 5/2016 | Davda | G06F 13/28 |
| | | | | 710/308 |
| 2016/0188513 | A1* | 6/2016 | Nair | G06F 13/366 |
| | | | | 710/113 |
| 2016/0203027 | A1* | 7/2016 | Challa | G06F 9/5038 |
| | | | | 718/1 |
| 2016/0239328 | A1* | 8/2016 | Kaplan | G06F 9/45558 |
| 2017/0235584 | A1* | 8/2017 | Tchapda | G06F 9/45558 |
| | | | | 714/57 |
| 2017/0242763 | A1* | 8/2017 | Arroyo | G06F 9/45558 |
| 2020/0050523 | A1* | 2/2020 | Pawlowski | G06F 11/203 |

OTHER PUBLICATIONS

IBM, *System and Method for Device name Generation using Client supplied Patterns*, An IP.com Prior Art Database Technical Disclosure, Original Publication Date: Dec. 21, 2009, IP.com No. IPCOM000191214D, IP.com Electronic Publication Date: Dec. 21, 2009, 4 pages.

IBM, *A method to rebuild a Corrupted/Missing File Back Device Side Car File*, An IP.com Prior Art Database Technical Disclosure, Original Publication Date: Dec. 9, 2008, IP.com No. IPCOM000177356D, IP.com Electronic Publication Date: Dec. 9, 2008, 3 pages.

* cited by examiner

MANAGING A POOL OF VIRTUAL FUNCTIONS

BACKGROUND

Field of the Invention

The field of the invention is data processing, or, more specifically, methods, apparatus, and products for managing a pool of virtual functions.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for managing a pool of virtual functions are disclosed in this specification. Managing a pool of virtual functions includes generating a virtual function pool comprising a plurality of virtual functions for at least one single root input/output virtualization (SR-IOV) adapter, wherein the virtual function pool is generated using a fault tolerance indicating an amount and type of failures to accommodate without loss of access by the plurality of virtual functions; creating a control path from a client virtual network interface controller (VNIC) driver in a first client partition to a target network using an active virtual function, wherein the active virtual function is selected from the virtual function pool; receiving a failure alert indicating that the control path from the client VNIC driver in the first client partition to the target network using the active virtual function has failed; selecting, from the virtual function pool, a backup virtual function for the first client partition based on the failure alert; and recreating the control path from the client VNIC driver in the first client partition to the target network using the backup virtual function.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
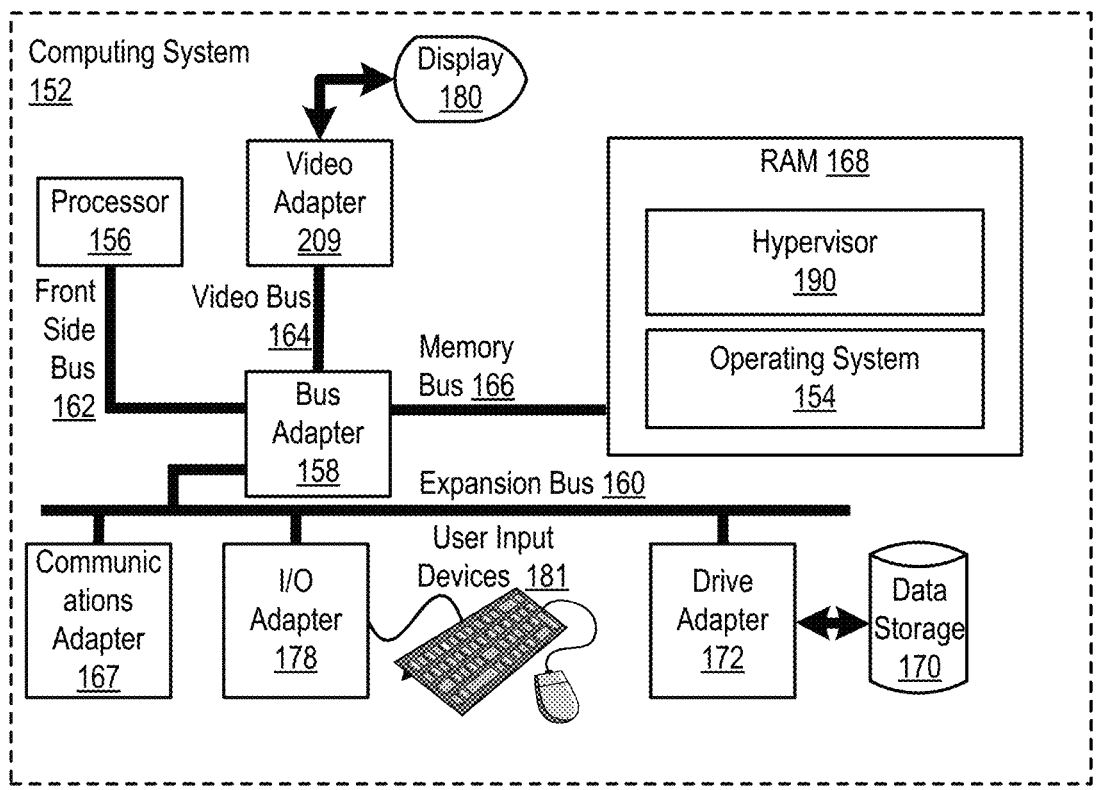
FIG. 1 sets forth a block diagram of an example system configured for managing a pool of virtual functions according to embodiments of the present invention.

Exemplary methods, apparatus, and products for managing a pool of virtual functions in accordance with the present invention are described with reference to the accompanying drawings, beginning with FIG. 1. FIG. 1 sets forth a block diagram of automated computing machinery comprising an exemplary computing system (152) configured for managing a pool of virtual functions according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for managing a pool of virtual functions according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170). Also stored in RAM is a hypervisor (190), a module for, in part, managing a pool of virtual functions according to embodiments of the present invention.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for managing a pool of virtual functions according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for managing a pool of virtual functions according to embodiments of the present invention include modems for wired dial-up communications, Ethernet (IEEE 802.3) adapters for wired data communications, 802.11 adapters for wireless data communications, and single root input/output virtualization (SR-IOV) adapters.

Figure 2:
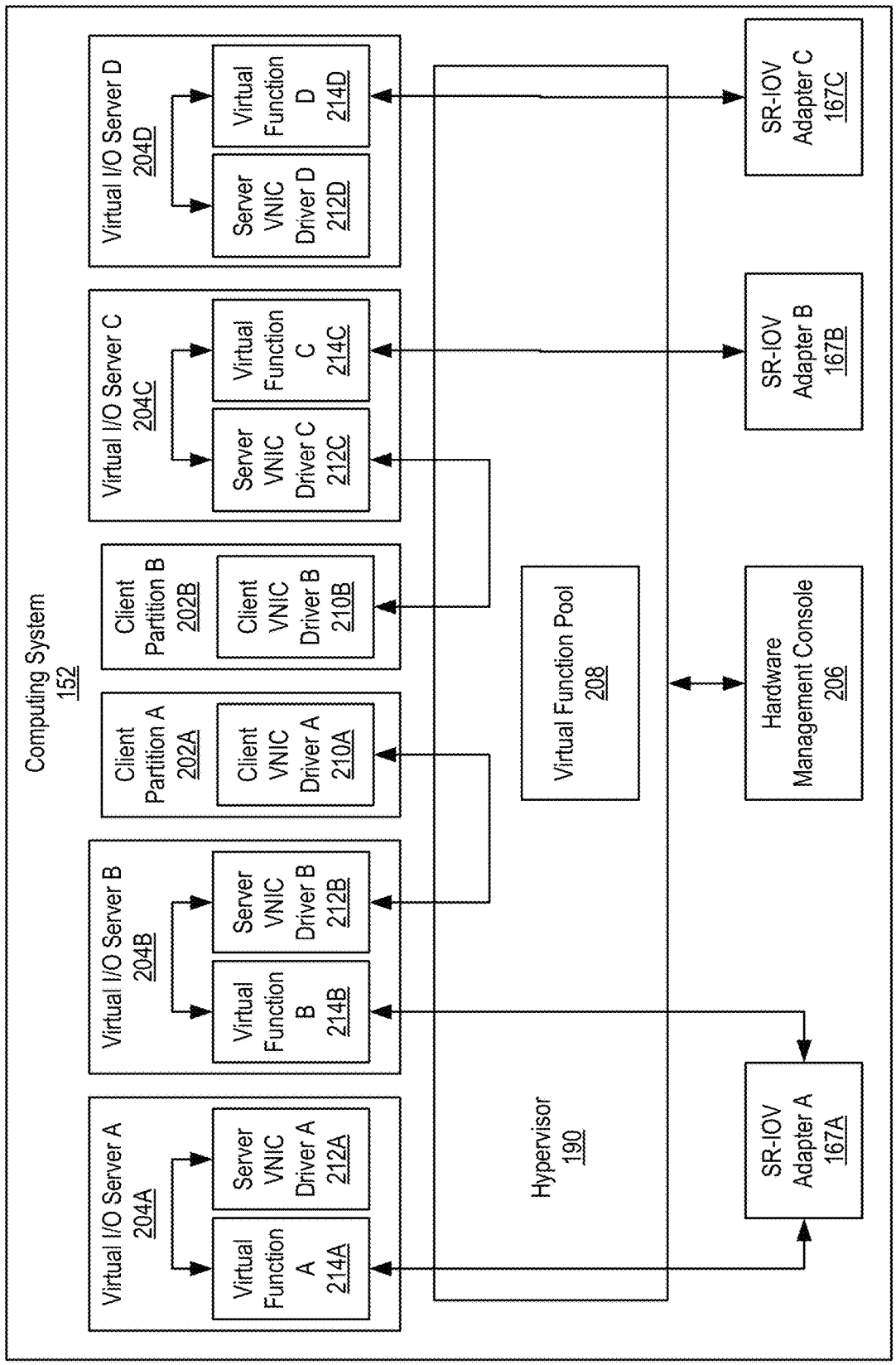
FIG. 2 sets forth a block diagram of an example system configured for managing a pool of virtual functions according to embodiments of the present invention.

FIG. 2 shows an exemplary system for managing a pool of virtual functions according to embodiments of the present invention. As shown in FIG. 2, the exemplary computing system (152) includes multiple client partitions (client partition A (202A), client partition B (202B)) and multiple virtual input/output (I/O) servers (virtual I/O server A (204A), virtual I/O server B (204B), virtual I/O server C (204C), virtual I/O server D (204D)) hosted by a hypervisor (190). The computing system (152) also includes multiple single root input/output virtualization (SR-IOV) adapters (SR-IOV adapter A (167A), SR-IOV adapter B (167B), SR-IOV adapter C (167C)). Each client partition (client partition A (202A), client partition B (202B)) includes a client virtual network interface controller (VNIC) driver (client VNIC driver A (210A), client VNIC driver B (210B)), and each virtual I/O server (virtual I/O server A (204A), virtual I/O server B (204B), virtual I/O server C (204C), virtual I/O server D (204D)) includes at least one server VNIC driver (server VNIC driver A (212A), server VNIC driver B (212B), server VNIC driver C (212C), server VNIC driver D (212D)) and at least one virtual function (virtual function A (214A), virtual function B (214B), virtual function C (214C), virtual function D (214D)). The computing system (152) also includes a hardware management console (HMC). The hypervisor includes a virtual function pool (208).

Each client partition (client partition A (202A), client partition B (202B)) is an aggregation of hardware and software configured to send and receive data in the form of data packets using a client VNIC driver (client VNIC driver A (210A), client VNIC driver B (210B)). Each client partition may be an isolated execution environment accessible and configurable by a client. Each client partition may be assigned a subset of the hardware resources of the computing system (152), such as processor and memory resources. Each client partition may be assigned a workload to process using the assigned a subset of the hardware resources and connection to a target network. Each client partition may be referred to as virtual machine or logical partition.

Each client partition (client partition A (202A), client partition B (202B)) sends data using a control path. A control path is a collection of elements used to transfer instructions and data pointers between a target network (not shown) and a client partition. A control path includes a client VNIC driver, a server VNIC driver, a virtual function, and an SR-IOV adapter. Each control path is used to send data with minimal overhead. Data pointers may be transferred between each element in the control path, and the data may be sent and received between the SR-IOV adapter and client VNIC driver using the data pointers and without inspecting the data within each packet, reducing system overhead.

Each client VNIC driver (client VNIC driver A (210A), client VNIC driver B (210B)) is an aggregation of hardware and software capable of sending and receiving data (e.g., in the form of data packets) and data pointers. Each client partition interacts with a client VNIC driver as a virtual device configured to operate as a network interface controller for the client partition.

Each virtual I/O server (virtual I/O server A (204A), virtual I/O server B (204B), virtual I/O server C (204C), virtual I/O server D (204D)) is an aggregation of hardware and software configured to host at least one server VNIC driver and at least one virtual function. Each virtual I/O server may be an isolated execution environment configurable by the hypervisor (190). Each virtual I/O server may be assigned a subset of the hardware resources of the computing system (152), such as processor and memory resources. Each virtual I/O server may be referred to as virtual machine or logical partition.

Each server VNIC driver (server VNIC driver A (212A), server VNIC driver B (212B), server VNIC driver C (212C), server VNIC driver D (212D)) is an aggregation of hardware and software capable of interacting with a client VNIC driver and virtual function to send and receive instructions and data pointers. Each server VNIC driver may receive instructions and data pointers from a virtual function, prepare the data for transmission to a client VNIC driver, and transmit the instructions and data pointers to the client VNIC driver via the hypervisor (190). Each server VNIC driver may also receive instructions and data pointers from a client VNIC driver via the hypervisor (190), prepare the instructions and data pointers for a virtual function, and provide the instructions and data pointers to the virtual function.

Each client VNIC driver (client VNIC driver A (210A), client VNIC driver B (210B)) is communicatively coupled to one virtual function (via a server VNIC driver) at a time. In the event of a failure of the virtual function, the control path between the client VNIC driver and target network may be recreated using a different virtual function. Using the exemplary system of FIG. 2, client partition A (202A) has a control path to SR-IOV adapter A (167A) using client VNIC driver A (210A), server VNIC driver B (212B) and virtual function B (214B). If virtual function B (214B) fails, then the hypervisor may recreate the control path using virtual function A (214A) and server VNIC driver A (212A).

Each virtual function (virtual function A (214A), virtual function B (214B), virtual function C (214C), virtual function D (214D)) is an aggregation of hardware and software capable of interacting with a server VNIC driver and SR-IOV adapter to send and receive instructions and data pointers. Each virtual function may receive instructions and data pointers from a SR-IOV adapter, prepare the instructions and data pointers for a server VNIC driver, and send the instructions and data pointers to the server VNIC driver. Each virtual function may also receive instructions and data pointers from a server VNIC driver, prepare the instructions and data pointers for a SR-IOV adapter, and transmit the instructions and data pointers to the SR-IOV adapter via the hypervisor (190). Each virtual function may be associated with a physical function of the SR-I/OV adapter. An active virtual function refers to a virtual function that is an element of a control path in use by a client partition. Similarly, an inactive virtual function refers to a virtual function that is not an element of a control path in use by any client partition.

Each SR-IOV adapter (SR-IOV adapter A (167A), SR-IOV adapter B (167B), SR-IOV adapter C (167C)) is an aggregation of hardware and software capable of interacting with one or more virtual functions to receive data from and transmit data over a communications medium (not shown), such as a network or interconnect. Each SR-IOV adapter may receive instructions and data pointers from a virtual function, retrieve and prepare the data for transmission over a communications medium, and transmit the data over the communications medium. Each SR-IOV adapter may also receive data from a communications medium, store the data in memory identified by data pointers, prepare instructions and data pointers for a virtual function, and transmit the instructions and data pointers to the virtual function via the hypervisor (190). Each SR-IOV adapter may be communicatively coupled to one or more virtual functions.

Each SR-IOV adapter (SR-IOV adapter A (167A), SR-IOV adapter B (167B), SR-IOV adapter C (167C)) may include multiple physical ports (not shown), and each physical port may be connected to a network. Each physical port on the SR-IOV may be connected to a different network, the same network, or any combination thereof. Each virtual function provides a portion of access and control of a physical port on the SR-IOV adapter. As an example using the exemplary system of FIG. 2, SR-IOV adapter A (167A) may include one physical port divided between two virtual functions (virtual function A (214A) and virtual function B (214B)). SR-IOV adapter A (167A) may be configured to provide half of the throughput of the physical port to virtual function A (214A) and half of the throughput to virtual function B (214B). A virtual function is referred to as associated with a physical port when that virtual function provides access to that physical port through a control path.

Upon migration to or instantiation on the computing system (152), each client partition (client partition A (202A), client partition B (202B)) may request access to a target network. A target network is a network to which a client partition has requested access. In response to such a request, the hypervisor may select a virtual function associated with (i.e., provides access to) the target network. The request from the client partition may also include desired characteristics of the connection to the target network, such as a minimum throughput (e.g., bandwidth speed).

The hypervisor (190) is an aggregation of hardware and software that manages the client partitions, virtual I/O servers, SR-IOV adapters, and virtual function pool (208) on the computing system (152). The hypervisor instantiates and monitors the client partitions and virtual I/O servers on the computing system (152). The hypervisor also establishes control paths between client VNIC drivers, server VNIC drivers, virtual functions, and SR-IOV adapters. The hypervisor (190) further directs data communications between each client VNIC driver and an associated server VNIC driver, and between the virtual functions and the SR-IOV adapters.

The hardware management console (HMC) (206) is an aggregation of hardware and software that provides an interface with the hypervisor (190). Further, the HMC (206) may provide configuration information about the computing system (152) and virtual function pool (208) to hypervisor (190). Although FIG. 2 depicts the HMC (206) as within the computing system (152), the HMC may be an entity separate and distinct from the computing system (152) and communicatively coupled to the computing system (152).

The virtual function pool (208) is an aggregation of hardware and software that provides a repository of information about virtual functions on the computing system (152). Specifically, the virtual function pool (208) may include an identifier of each virtual function on the computing system and information about the virtual function keyed to the virtual function identifier. Such information may include, for example, an identifier of the physical port associated with the virtual function, whether the virtual function is an active virtual function, an identifier of the virtual I/O server hosting the virtual function, and an identifier of the server VNIC driver communicatively coupled to the virtual function. For active virtual functions, the virtual function pool may also include an identifier of the client VNIC driver and client partition for which the virtual function is providing access to a target network.

The virtual function pool (208) may also maintain status information about each virtual function and associated physical port. Specifically, the virtual function pool (208) may include metrics tracking the throughput on each physical port and the throughput of each virtual function associated with the physical port. The virtual function pool (208) may also include metrics tracking the total throughput of each SR-IOV adapter.

The hypervisor (190) uses virtual function pool (208) to select a configuration of control paths for each client partitions hosted on the system. The hypervisor (190) may target an optimal configuration of control paths for the client partitions given the available virtual functions and the status of the physical ports on the SR-IOV adapter.

The virtual function pool (208) may be generated using a fault tolerance indicating an amount and type of failures to accommodate without loss of access by the plurality of virtual functions. The fault tolerance may be received by the hypervisor (190) from the HMC (206) to indicate a redundancy level for the network connections provided by the computing system via the SR-IOV adapters. The amount of failures to accommodate without loss of access may include a number relative to the total number of physical ports, SR-IOV adapters, virtual functions, or number of physical ports connected to each network. Examples of amounts of failures to accommodate without loss of access include, but are not limited to, a specified number of SR-IOV adapters that may fail, a percentage of the virtual functions that are coupled to a specific network that may fail, a specified number of physical ports that may fail, or a percentage of physical ports connected to a specified network that may fail.

The type of failures to accommodate without loss of access may include categories of failures such as software failures or hardware failures. Software failures may include virtual function or VNIC driver malfunction. Hardware failures may include physical port failures such as physical port damage or a disconnected cable (impacting all virtual functions on a single physical port) and SR-IOV adapter failures (impacting all devices on a single SR-IOV adapter). Such failures may be in terms of consequences, such as network disconnect, level of throughput below an acceptable speed, or level of throughput exceeding a maximum throughput threshold beyond which negative impacts may occur (e.g., reduced ability to service incoming and outgoing data, physical damage to the hardware components).

Figure 3:
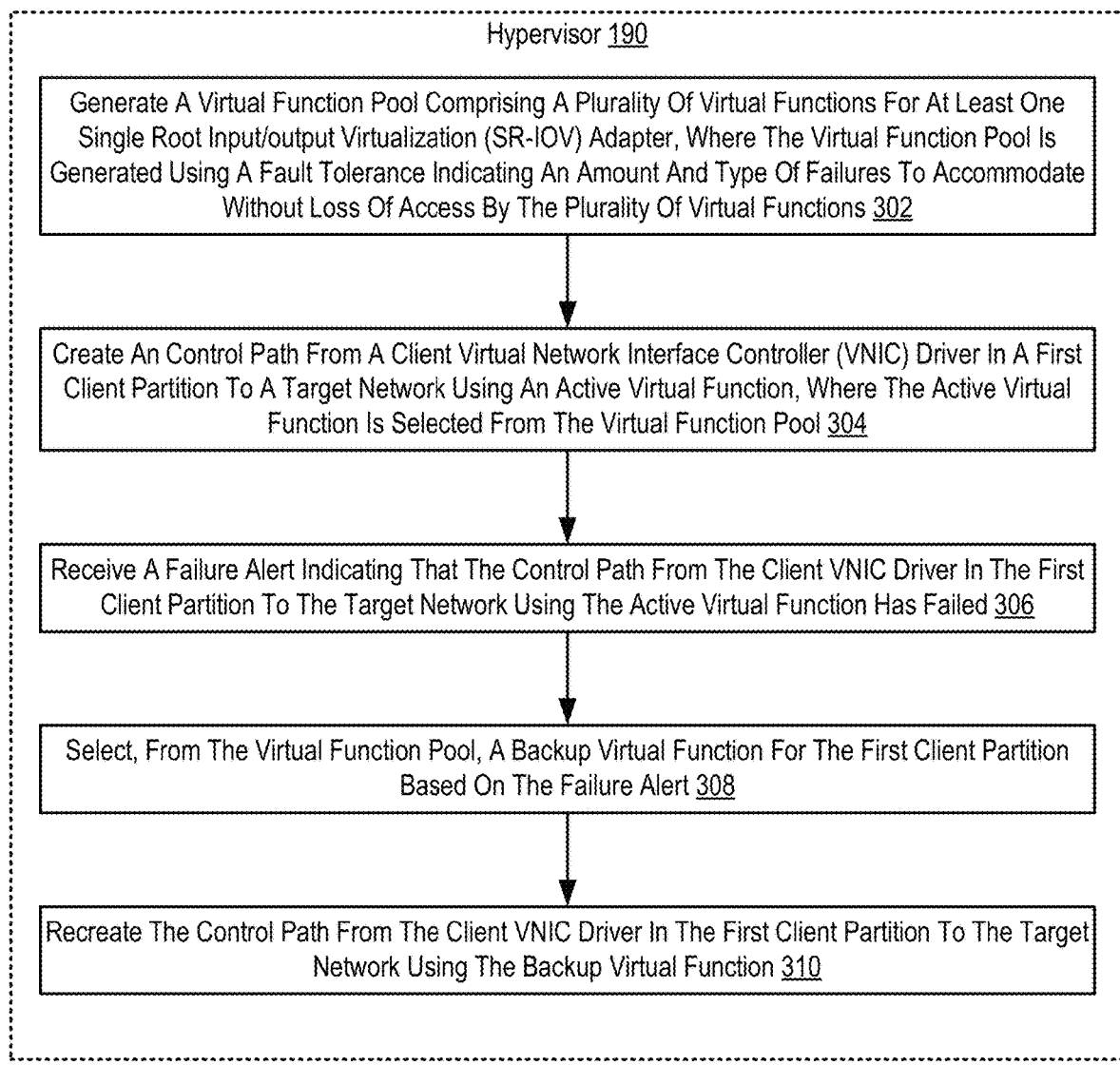
FIG. 3 sets forth a flow chart illustrating an exemplary method for managing a pool of virtual functions according to embodiments of the present invention.

For further explanation, FIG. 3 sets forth a flow chart illustrating an exemplary method for managing a pool of virtual functions according to embodiments of the present invention that includes generating (302) a virtual function pool comprising a plurality of virtual functions for at least one single root input/output virtualization (SR-IOV) adapter, wherein the virtual function pool is generated using a fault tolerance indicating an amount and type of failures to accommodate without loss of access by the plurality of virtual functions. Generating (302) a virtual function pool comprising a plurality of virtual functions for at least one SR-IOV adapter, wherein the virtual function pool is generated using a fault tolerance indicating an amount and type of failures to accommodate without loss of access by the plurality of virtual functions may be carried out by the hypervisor (190) creating the virtual function pool based on information from the HMC.

The HMC may notify the hypervisor of the available virtual functions for inclusion in the virtual function pool. The virtual functions in the virtual function pool may each have the same or similar characteristics. For example, each virtual function in the virtual function pool may be configured with the same maximum throughput or may be coupled to the same network. Alternatively, the virtual in the virtual function pool may have different characteristics. For example, some virtual function in the virtual function pool may be configured with a greater throughput than other virtual functions in the virtual function pool or may be coupled to different networks.

The HMC may also notify the hypervisor of a fault tolerance for the virtual function pool indicating an amount and type of failures to accommodate without loss of access by the plurality of virtual functions. For example, the notification may instruct the hypervisor to tolerate one SR-IOV adapter failure and one physical port failure. The hypervisor (190) uses the fault tolerance to determine the necessary size and makeup of the virtual function pool. If the size and makeup of the virtual function pool is insufficient to meet the received fault tolerance, the hypervisor may notify the HMC that additional SR-IOV adapters should be installed on the computing system to meet the fault tolerance. If the size and makeup of the virtual function pool exceeds that which is necessary to satisfy the fault tolerance, the hypervisor may notify the HMC that one or more SR-IOV adapters may be removed while still maintaining the fault tolerance. The fault tolerance indicating an amount and type of failures to accommodate without loss of access by the plurality of virtual functions may indicate an amount and type of failures to accommodate without loss of access by the subset of virtual functions in the virtual function pool that are active virtual functions (i.e., are incorporated into a control path).

The method of FIG. 3 further includes creating (304) a control path from a client virtual network interface controller (VNIC) driver in a first client partition to a target network using an active virtual function, wherein the active virtual function is selected from the virtual function pool. Creating (304) a control path from a client VNIC driver in a first client partition to a target network using an active virtual function, wherein the active virtual function is selected from the virtual function pool may be carried out by the hypervisor receiving, from the first client partition, a request for a connection to the target network; selecting, from the virtual function pool, a virtual function for the first client partition based on the request; and indicating that the selected virtual function is an active virtual function in the virtual function pool.

The client partition may generate the request without a reference to a specific virtual function or SR-IOV adapter. Instead, the client partition may only include an identifier of the target network to which the client partition should be coupled. The request may further indicate that the virtual function selection should be made by the hypervisor. Additionally, the request may lack an indication of backup virtual functions to use, and selecting backup virtual functions is left to the hypervisor. In response, the hypervisor searches the virtual function pool for an inactive virtual function that is associated with the target network and satisfies any other requirements listed in the request.

The method of FIG. 3 further includes receiving (306) a failure alert indicating that the control path from the client VNIC driver in the first client partition to the target network using the active virtual function has failed. Receiving (306) a failure alert indicating that the control path from the client VNIC driver in the first client partition to the target network using the active virtual function has failed may be carried out by the hypervisor in response to monitoring the elements of each control path to determine whether data pointers, instructions, and data are transferring at expected rates. A failure alert is a notification that the data pointers, instructions, and data are not transferring at expected rates (therefore the control path has failed). A control path may have failed but maintain an undesired or unexpected throughput.

The method of FIG. 3 further includes selecting (308), from the virtual function pool, a backup virtual function for the first client partition based on the failure alert. Selecting (308), from the virtual function pool, a backup virtual function for the first client partition based on the failure alert may be carried out by the hypervisor searching the virtual function pool for an inactive virtual function that provides a control path to the same target network as the failed active virtual function. The failure alert may identify the client partition, the target network, and/or the failed active virtual function. The hypervisor may also receive from the failure alert, or maintain information about, the desired capacity required for current workload on the client partition utilizing the failed control path. This information may then be used to search the virtual function pool for a similar virtual function to select as the backup virtual function.

The backup virtual function may be selected dynamically in that the process of selecting the backup virtual function is not completed until after the failure notification is received. Using the information from the failure alert and current (as of the time of the failure alert) information about the status of each physical port, the hypervisor may select a virtual function best suited for the client partition. The failed active virtual function is then returned to the virtual function pool as an inactive virtual function.

If the hypervisor is unable to find a suitable virtual function from the virtual function pool, the hypervisor may generate an error to send to the client partition and/or the HMC. The error may request that additional SR-IOV adapters be added to the computing system and coupled to the target network. A virtual function associated with a port on the newly attached SR-IOV adapter and coupled to the target network may then be selected as the backup virtual function for the first client partition.

The method of FIG. 3 further includes recreating (310) the control path from the client VNIC driver in the first client partition to the target network using the backup virtual function. Recreating (310) the control path from the client VNIC driver in the first client partition to the target network using the backup virtual function may be carried out by the hypervisor generating the control path from the client VNIC driver in the first client partition to a server VNIC driver communicatively coupled to the selected backup virtual function.

The above-described limitations improve the operation of the computer system by reducing the configuration necessary for client partitions to access a target network. Specifically, a client partition need not specify a particular virtual function to use in a control path to a target network. Rather, the client partition requests access to the target network, and the hypervisor selects a virtual function that best satisfies the request given the workload processing goals of the client partition and the overall goals of the computing system. Further, the client partitions are prevented from inadvertently attempting to use virtual functions that do not satisfy the requirements of the client partition, such as being associated with the wrong physical port and network.

The above-described limitations also improve the operation of the computer system by reducing the number of virtual functions necessary to provide network access redundancy for a group of client partitions. Specifically, a client partition need not reserve particular virtual functions as backup virtual functions in case the active virtual function fails. Reserving particular virtual functions results in those virtual functions being blocked from use by other client partitions even though the virtual functions are not currently active.

Figure 4:
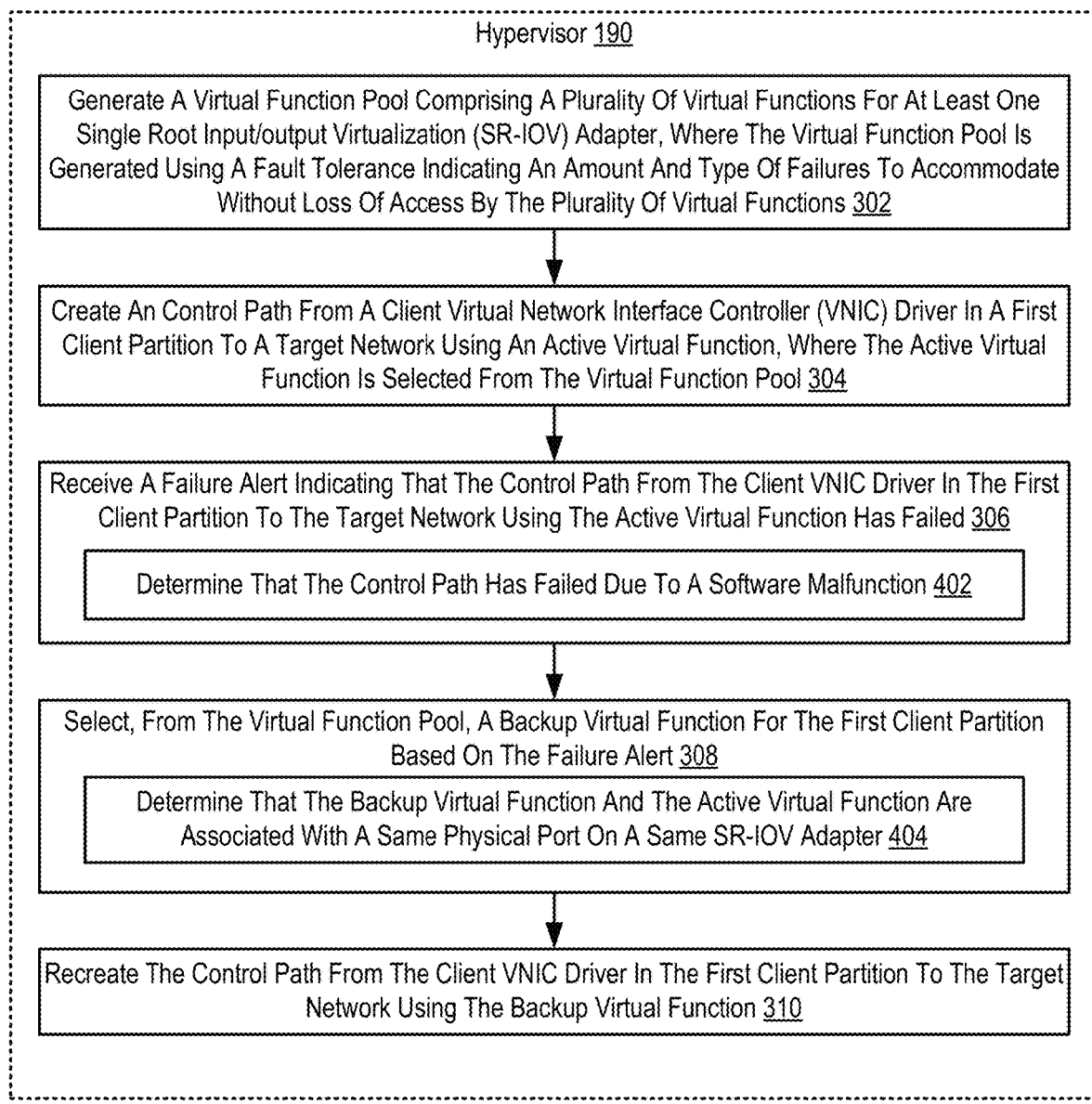
FIG. 4 sets forth a flow chart illustrating an exemplary method for managing a pool of virtual functions according to embodiments of the present invention.

For further explanation, FIG. 4 sets forth a flow chart illustrating a further exemplary method for managing a pool of virtual functions according to embodiments of the present invention that includes generating (302) a virtual function pool comprising a plurality of virtual functions for at least one single root input/output virtualization (SR-IOV) adapter, wherein the virtual function pool is generated using a fault tolerance indicating an amount and type of failures to accommodate without loss of access by the plurality of virtual functions; creating (304) a control path from a client virtual network interface controller (VNIC) driver in a first client partition to a target network using an active virtual function, wherein the active virtual function is selected from the virtual function pool; receiving (306) a failure alert indicating that the control path from the client VNIC driver in the first client partition to the target network using the active virtual function has failed; selecting (308), from the virtual function pool, a backup virtual function for the first client partition based on the failure alert; and recreating (310) the control path from the client VNIC driver in the first client partition to the target network using the backup virtual function.

The method of FIG. 4 differs from the method of FIG. 3, however, in that receiving (306) a failure alert indicating that the control path from the client VNIC driver in the first client partition to the target network using the active virtual function has failed includes determining (402) that the control path has failed due to a software malfunction. Determining (402) that the control path has failed due to a software malfunction may be carried out by the hypervisor diagnosing the failure using the failure alert. A software malfunction is a malfunction of the virtual function, virtual I/O server, or server VNIC driver. A software malfunction may result in the virtual function, virtual I/O server, or server VNIC driver becoming unresponsive or engage in unexpected behavior.

The method of FIG. 4 also differs from the method of FIG. 3 in that selecting (308), from the virtual function pool, a backup virtual function for the first client partition based on the failure alert includes determining (404) that the backup virtual function and the active virtual function are associated with a same physical port on a same SR-IOV adapter. Determining (404) that the backup virtual function and the active virtual function are associated with a same physical port on a same SR-IOV adapter may be carried out by the hypervisor searching the virtual function pool for one or more virtual functions coupled to the same target network and associated with the same SR-IOV as the failed active virtual function.

The hypervisor may use the first virtual function found in the virtual function pool that matches the criteria (e.g., associated with the same SR-IOV as the failed active virtual function) in order to reconnect the first client partition with the target network with a minimal amount of delay. The hypervisor may organize a list of inactive virtual functions associated with the same physical port or physical port on the same SR-IOV adapter connected to the same target network. From the organized list, the hypervisor may select the virtual function with the highest configured available throughput or an available throughput that best matches the throughput of the failed active virtual function. Once the control path is reestablished, the hypervisor may reassess the control paths of each client partition and recreate the control paths based on computing system goals, such as highest average throughput among all control paths.

Figure 5:
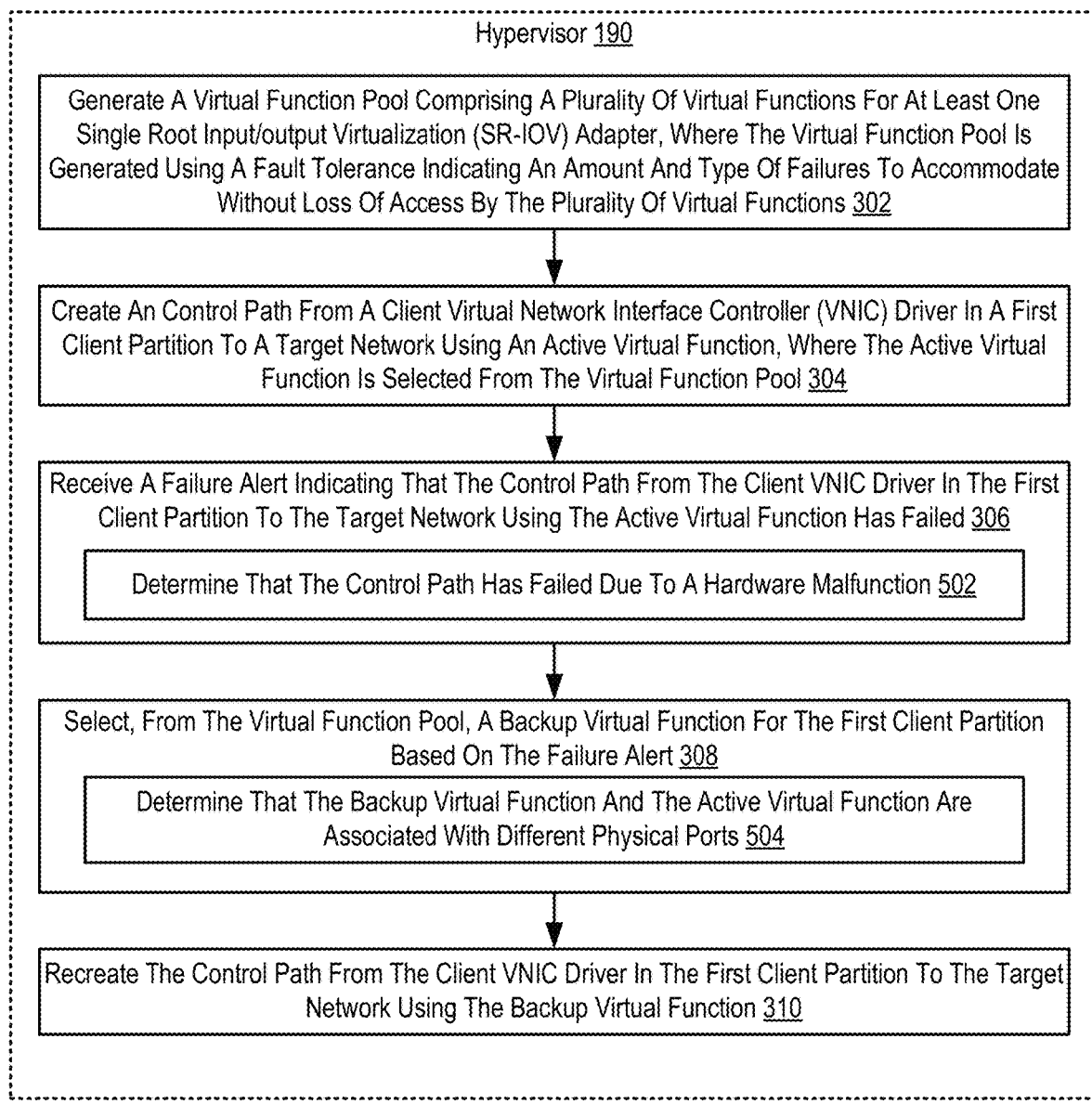
FIG. 5 sets forth a flow chart illustrating an exemplary method for managing a pool of virtual functions according to embodiments of the present invention.

For further explanation, FIG. 5 sets forth a flow chart illustrating a further exemplary method for managing a pool of virtual functions according to embodiments of the present invention that includes generating (302) a virtual function pool comprising a plurality of virtual functions for at least one single root input/output virtualization (SR-IOV) adapter, wherein the virtual function pool is generated using a fault tolerance indicating an amount and type of failures to accommodate without loss of access by the plurality of virtual functions; creating (304) a control path from a client virtual network interface controller (VNIC) driver in a first client partition to a target network using an active virtual function, wherein the active virtual function is selected from the virtual function pool; receiving (306) a failure alert indicating that the control path from the client VNIC driver in the first client partition to the target network using the active virtual function has failed; selecting (308), from the virtual function pool, a backup virtual function for the first client partition based on the failure alert; and recreating (310) the control path from the client VNIC driver in the first client partition to the target network using the backup virtual function.

The method of FIG. 5 differs from the method of FIG. 3, however, in that receiving (306) a failure alert indicating that the control path from the client VNIC driver in the first client partition to the target network using the active virtual function has failed includes determining (502) that the control path has failed due to a hardware malfunction. Determining (502) that the control path has failed due to a hardware malfunction may be carried out by the hypervisor diagnosing the failure using the failure alert. A hardware malfunction is a malfunction of the SR-IOV adapter, the physical port, or computing resources supporting the virtual I/O server, virtual function, or server VNIC driver. A hardware malfunction may result in an interruption to network connectivity or physical port inactivity.

The method of FIG. 5 also differs from the method of FIG. 3 in that selecting (308), from the virtual function pool, a backup virtual function for the first client partition based on the failure alert includes determining (504) that the backup virtual function and the active virtual function are associated with different physical ports. Determining (504) that the backup virtual function and the active virtual function are associated with different physical ports may be carried out by the hypervisor searching the virtual function pool for one or more virtual functions coupled to the same target network but associated a different physical port on the same SR-IOV adapter or a different SR-IOV adapter.

As discussed above, the hypervisor may use the first virtual function found in the virtual function pool that matches the criteria (e.g., coupled to the same target network but associated a different physical port on the same SR-IOV adapter or a different SR-IOV adapter) in order to reconnect the first client partition with the target network with a minimal amount of delay. Once the control path is reestablished, the hypervisor may reassess the control paths of each client partition and recreate the control paths based on computing system goals, such as highest average throughput among all control paths.

Figure 6:
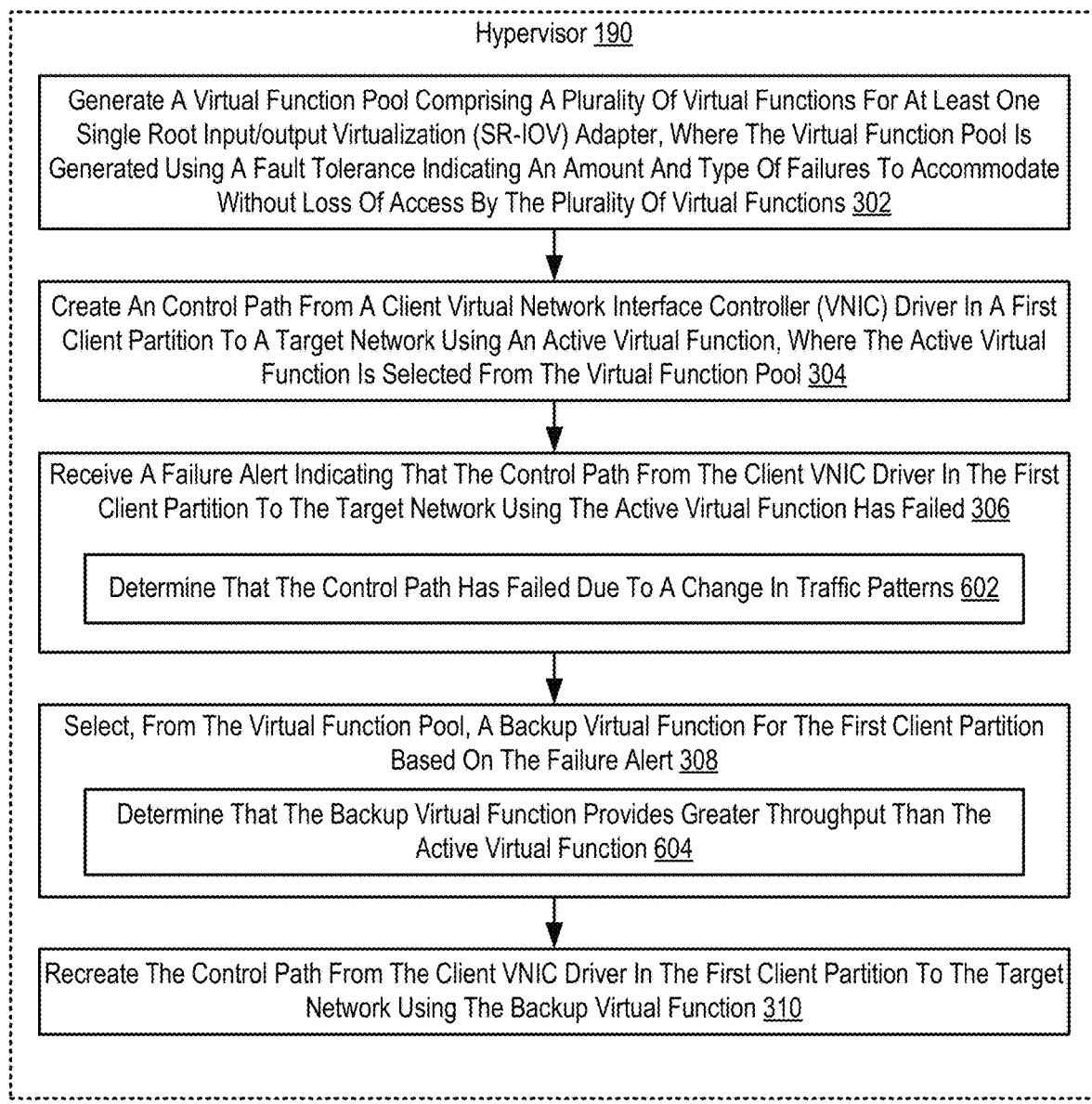
FIG. 6 sets forth a flow chart illustrating an exemplary method for managing a pool of virtual functions according to embodiments of the present invention.

For further explanation, FIG. 6 sets forth a flow chart illustrating a further exemplary method for managing a pool of virtual functions according to embodiments of the present invention that includes generating (302) a virtual function pool comprising a plurality of virtual functions for at least one single root input/output virtualization (SR-IOV) adapter, wherein the virtual function pool is generated using a fault tolerance indicating an amount and type of failures to accommodate without loss of access by the plurality of virtual functions; creating (304) a control path from a client virtual network interface controller (VNIC) driver in a first client partition to a target network using an active virtual function, wherein the active virtual function is selected from the virtual function pool; receiving (306) a failure alert indicating that the control path from the client VNIC driver in the first client partition to the target network using the active virtual function has failed; selecting (308), from the virtual function pool, a backup virtual function for the first client partition based on the failure alert; and recreating (310) the control path from the client VNIC driver in the first client partition to the target network using the backup virtual function.

The method of FIG. 6 differs from the method of FIG. 3, however, in that receiving (306) a failure alert indicating that the control path from the client VNIC driver in the first client partition to the target network using the active virtual function has failed includes determining (602) that the control path has failed due to a change in traffic patterns. Determining (602) that the control path has failed due to a change in traffic patterns may be carried out by the hypervisor monitoring the control path and other control paths on the computing system and determining that a different virtual function would further workload processing goals of the first client partition and/or the overall goals of the computing system. For example, the control path utilized by the first client partition may have reduced throughput due to an increase in data traffic by other virtual function associated with the same physical port. In such a case, another virtual function associated with a different physical port coupled to the same target network may increase the throughput for each affected virtual function and client partition.

The method of FIG. 6 also differs from the method of FIG. 3 in that selecting (308), from the virtual function pool, a backup virtual function for the first client partition based on the failure alert includes determining (604) that the backup virtual function provides greater throughput than the active virtual function. Determining (604) that the backup virtual function provides greater throughput than the active virtual function may be carried out by the hypervisor searching the virtual function pool for a backup virtual function that would increase the throughput for the first client partition. Such a backup virtual function may be a virtual function associated with a different physical port coupled to the target network and on the same SR-IOV adapter or a different SR-IOV adapter. As used herein, greater throughput refers to the greater current ability to send and receive data at an expected rate, a greater potential ability to send and receive data at an expected rate, or to more reliably send and receive data at an expected rate.

Figure 7:
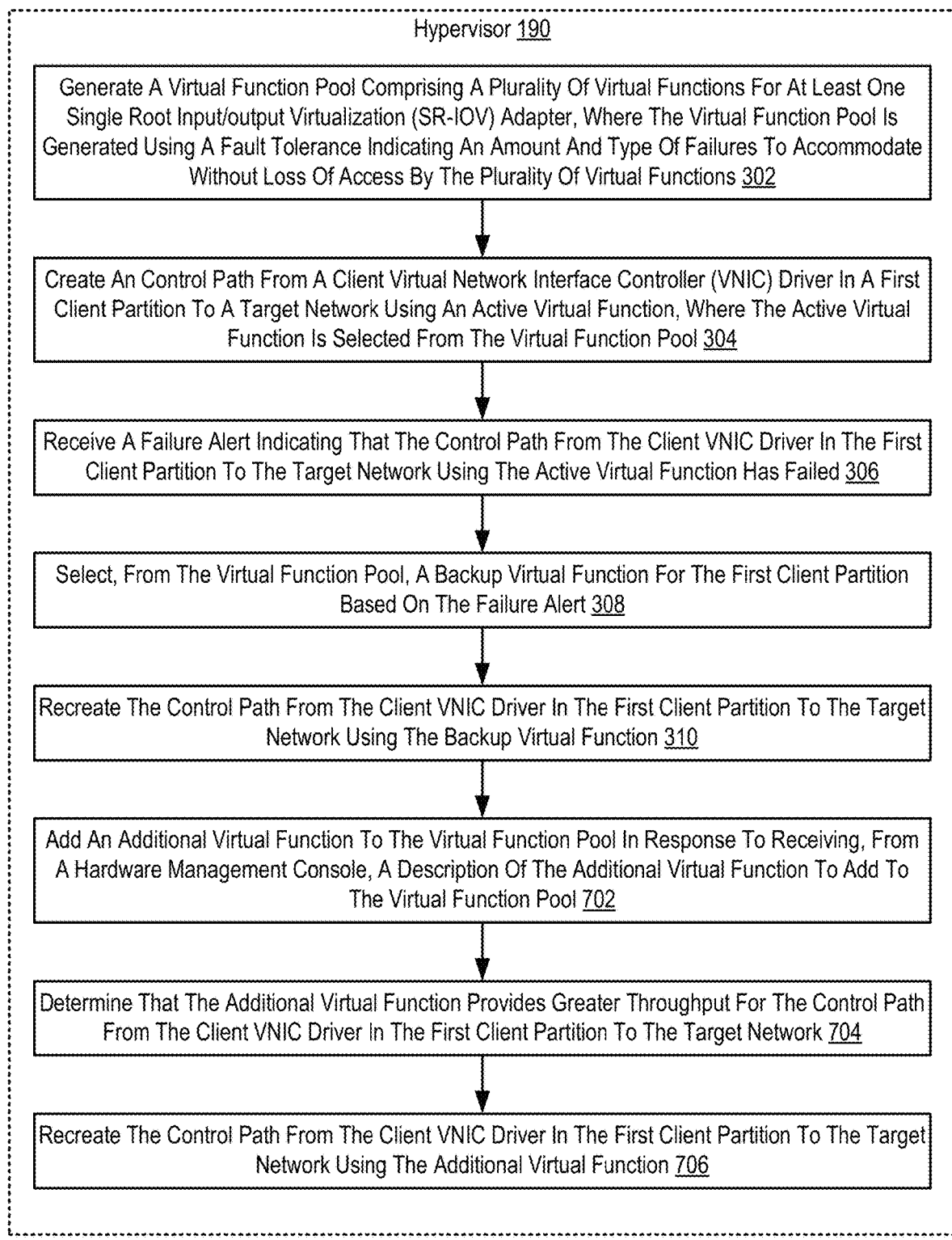
FIG. 7 sets forth a flow chart illustrating an exemplary method for managing a pool of virtual functions according to embodiments of the present invention.

For further explanation, FIG. 7 sets forth a flow chart illustrating a further exemplary method for managing a pool of virtual functions according to embodiments of the present invention that includes generating (302) a virtual function pool comprising a plurality of virtual functions for at least one single root input/output virtualization (SR-IOV) adapter, wherein the virtual function pool is generated using a fault tolerance indicating an amount and type of failures to accommodate without loss of access by the plurality of virtual functions; creating (304) a control path from a client virtual network interface controller (VNIC) driver in a first client partition to a target network using an active virtual function, wherein the active virtual function is selected from the virtual function pool; receiving (306) a failure alert indicating that the control path from the client VNIC driver in the first client partition to the target network using the active virtual function has failed; selecting (308), from the virtual function pool, a backup virtual function for the first client partition based on the failure alert; and recreating (310) the control path from the client VNIC driver in the first client partition to the target network using the backup virtual function.

The method of FIG. 7 differs from the method of FIG. 3, however, in that the method of FIG. 7 further includes adding (702) an additional virtual function to the virtual function pool in response to receiving, from a hardware management console, a description of the additional virtual function to add to the virtual function pool; determining (704) that the additional virtual function provides greater throughput for the control path from the client VNIC driver in the first client partition to the target network; and recreating (706) the control path from the client VNIC driver in the first client partition to the target network using the additional virtual function.

Adding (702) an additional virtual function to the virtual function pool in response to receiving, from a hardware management console, a description of the additional virtual function to add to the virtual function pool may be carried out by the hypervisor adding, to the virtual function pool, an identifier of the additional virtual function and information about the additional virtual function keyed to the virtual function identifier. The HMC may add or remove virtual functions from the computing system for reasons such as increasing the virtual function pool size, system maintenance, and general system or network reconfiguration.

Determining (704) that the additional virtual function provides greater throughput for the control path from the client VNIC driver in the first client partition to the target network may be carried out by the hypervisor, in response to adding the additional virtual function to the virtual function pool, reevaluating the control path of the first client partition and determining that the additional virtual function would further the workload processing goals of the first client partition better than the current backup virtual function.

Recreating (706) the control path from the client VNIC driver in the first client partition to the target network using the additional virtual function may be carried out by the hypervisor generating the control path from the client VNIC driver in the first client partition to a server VNIC driver communicatively coupled to the additional virtual function. The previously selected backup virtual function is then returned to the virtual function pool as an inactive virtual function.

Figure 8:
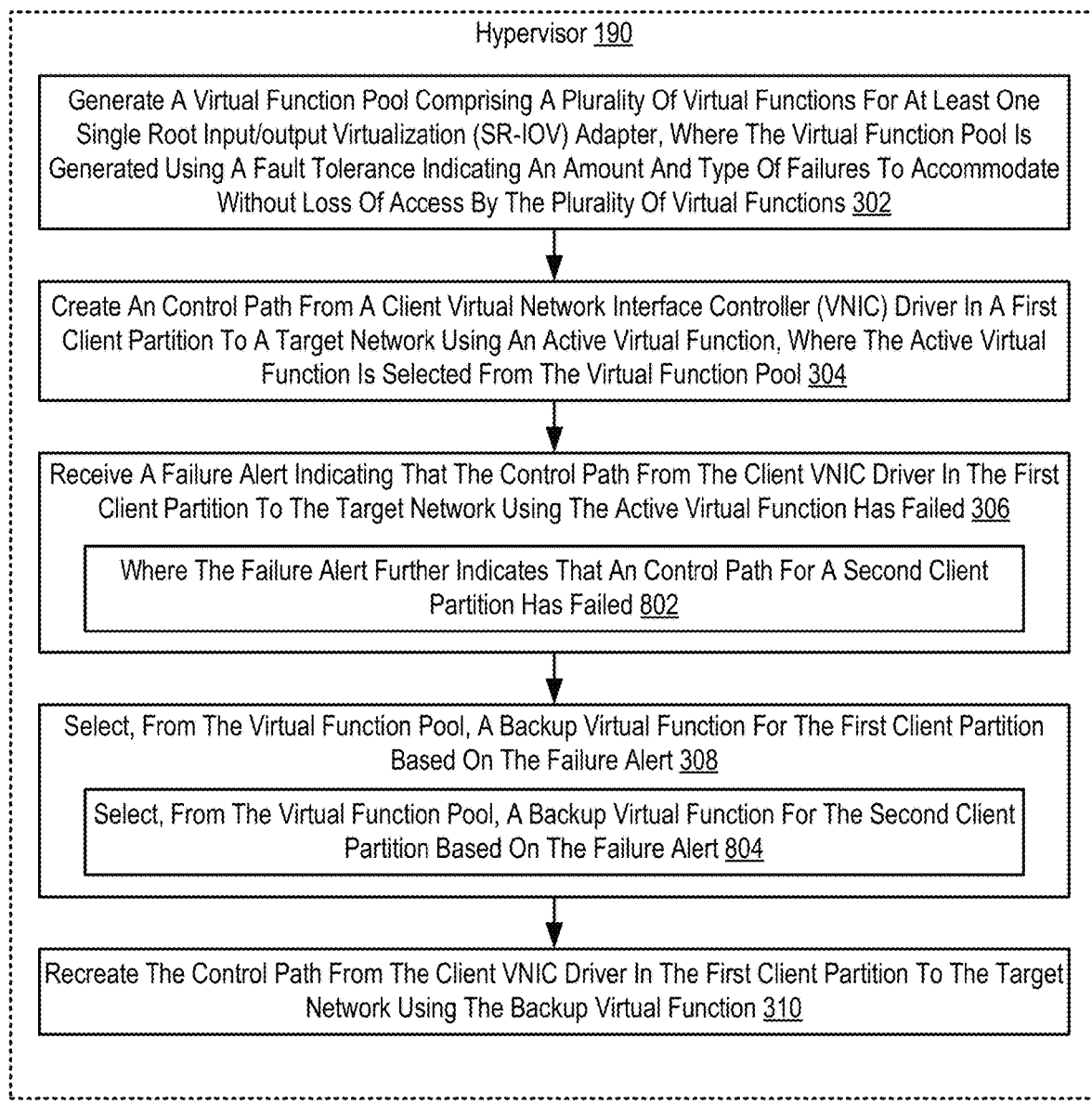
FIG. 8 sets forth a flow chart illustrating an exemplary method for managing a pool of virtual functions according to embodiments of the present invention.

For further explanation, FIG. 8 sets forth a flow chart illustrating a further exemplary method for managing a pool of virtual functions according to embodiments of the present invention that includes generating (302) a virtual function pool comprising a plurality of virtual functions for at least one single root input/output virtualization (SR-IOV) adapter, wherein the virtual function pool is generated using a fault tolerance indicating an amount and type of failures to accommodate without loss of access by the plurality of virtual functions; creating (304) a control path from a client virtual network interface controller (VNIC) driver in a first client partition to a target network using an active virtual function, wherein the active virtual function is selected from the virtual function pool; receiving (306) a failure alert indicating that the control path from the client VNIC driver in the first client partition to the target network using the active virtual function has failed; selecting (308), from the virtual function pool, a backup virtual function for the first client partition based on the failure alert; and recreating (310) the control path from the client VNIC driver in the first client partition to the target network using the backup virtual function.

The method of FIG. 8 differs from the method of FIG. 3, however, in that receiving (306) a failure alert indicating that the control path from the client VNIC driver in the first client partition to the target network using the active virtual function has failed includes wherein (802) the failure alert further indicates that a control path for a second client partition has failed. The failure alert indicating that a control path for a second client partition has failed may be determined by the hypervisor receiving the failure alert indicating that the control path for the first client partition and the control path for the second client partition have both failed. Such a situation may occur in response to a hardware malfunction in which each virtual function on a malfunctioning port or each virtual function on a malfunctioning SR-IOV adapter has failed.

The method of FIG. 8 also differs from the method of FIG. 3 in that selecting (308), from the virtual function pool, a backup virtual function for the first client partition based on the failure alert includes selecting (804), from the virtual function pool, a backup virtual function for the second client partition based on the failure alert. Selecting (804), from the virtual function pool, a backup virtual function for the second client partition based on the failure alert may be carried out by the hypervisor selecting each virtual function for each client partition from the same virtual function pool. Each inactive virtual function in the virtual function pool is unassigned until the hypervisor selects the virtual function for a control path. No inactive virtual function in the virtual function pool is reserved as a backup virtual function for a particular client partition in case the active virtual function for that client partition fails.

Figure 9:
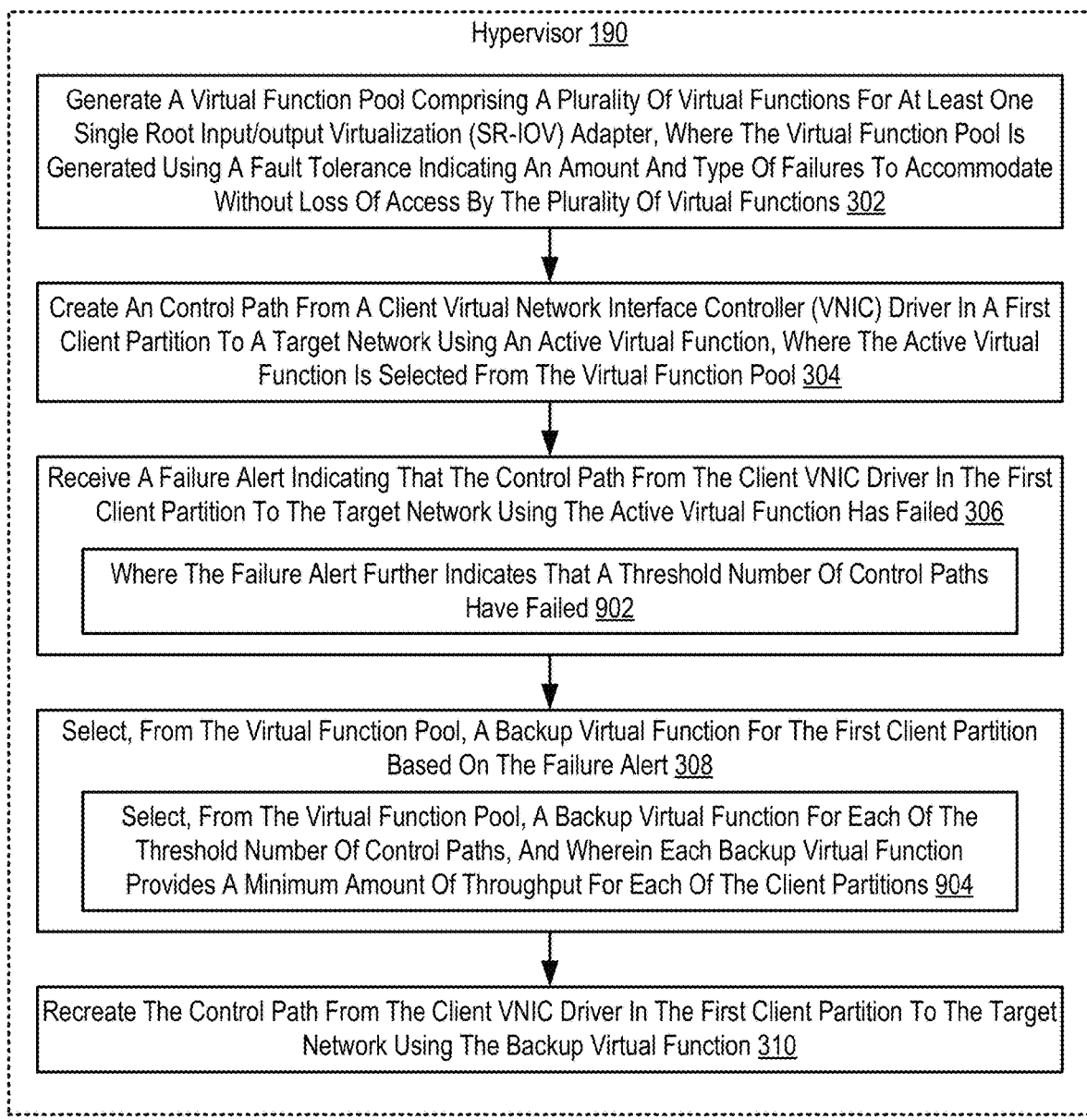
FIG. 9 sets forth a flow chart illustrating an exemplary method for managing a pool of virtual functions according to embodiments of the present invention.

For further explanation, FIG. 9 sets forth a flow chart illustrating a further exemplary method for managing a pool of virtual functions according to embodiments of the present invention that includes generating (302) a virtual function pool comprising a plurality of virtual functions for at least one single root input/output virtualization (SR-IOV) adapter, wherein the virtual function pool is generated using a fault tolerance indicating an amount and type of failures to accommodate without loss of access by the plurality of virtual functions; creating (304) a control path from a client virtual network interface controller (VNIC) driver in a first client partition to a target network using an active virtual function, wherein the active virtual function is selected from the virtual function pool; receiving (306) a failure alert indicating that the control path from the client VNIC driver in the first client partition to the target network using the active virtual function has failed; selecting (308), from the virtual function pool, a backup virtual function for the first client partition based on the failure alert; and recreating (310) the control path from the client VNIC driver in the first client partition to the target network using the backup virtual function.

The method of FIG. 9 differs from the method of FIG. 3, however, in that receiving (306) a failure alert indicating that the control path from the client VNIC driver in the first client partition to the target network using the active virtual function has failed includes wherein (902) the failure alert further indicates that a threshold number of control paths have failed. The failure alert indicating that a threshold number of control paths have failed may be determined by the hypervisor detecting that multiple control paths have failed such that the hypervisor implements a "spare tire" operating condition in which a minimum amount of throughput is provided to each virtual function to ensure that all active virtual functions receive at least a small amount of throughput. The threshold number of control paths may be, for example, a percentage of total control paths on the computing system (e.g., 80% of control paths) or a percentage or number of control paths accessing a particular target network).

The method of FIG. 9 also differs from the method of FIG. 3 in that selecting (308), from the virtual function pool, a backup virtual function for the first client partition based on the failure alert includes selecting (904), from the virtual function pool, a backup virtual function for each of the threshold number of control paths, and wherein each backup virtual function provides a minimum amount of throughput for each of the client partitions. Selecting (904), from the virtual function pool, a backup virtual function for each of the threshold number of control paths, and wherein each backup virtual function provides a minimum amount of throughput for each of the client partitions may be carried out by hypervisor selecting a collection of virtual functions for use specifically under a "spare tire" operating condition. These virtual functions may be configured to each provide a small but guaranteed amount of throughput to every active virtual function on the computing system. For example, under a normal operating condition, each virtual function may access 20% of the throughput of a physical port. Under the "spare tire" operating condition, each virtual function may access 5% of the throughput of a physical port because only a few physical ports may be operational as compared with the normal operating condition.

The minimum amount of throughput refers to a data transfer rate that provides only basic communication over the target network, but does not provide a sufficient amount of throughput to process a workload effectively over the target network. Once the hardware malfunctions that triggered the "spare tire" operating condition are resolved, new virtual functions are selected for each client partitions and the control paths and workloads resume normal operation.

In view of the explanations set forth above, readers will recognize that the benefits of managing a pool of virtual functions according to embodiments of the present invention include:

Improving the operation of a computing system by reducing the configuration necessary for client partitions to access a target network, increasing computing system efficiency and operational simplicity.

Improving the operation of a computing system by reducing the number of virtual functions necessary to provide network access redundancy for a group of client partitions, increasing computing system efficiency and cost.

Exemplary embodiments of the present invention are described largely in the context of a fully functional computer system for managing a pool of virtual functions. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing a pool of virtual functions, the method comprising:
    receiving a fault tolerance information for one or more connections to a network;
    identifying available virtual functions; and
    determining, from available virtual functions in dependence upon the fault tolerance information, a virtual function pool comprising a plurality of virtual functions for at least one single root input/output virtualization (SR-IOV) adapter, wherein the fault tolerance information specifies failures to accommodate without loss of access by the plurality of virtual functions.

2. The method of claim 1 further comprising:
    creating a control path from a client virtual network interface controller (VNIC) driver in a first client partition to a target network using an active virtual function, wherein the active virtual function is selected from the virtual function pool;
    receiving a failure alert indicating that the control path from the client VNIC driver in the first client partition to the target network using the active virtual function has failed;
    selecting, from the virtual function pool, a backup virtual function for the first client partition based on the failure alert; and
    recreating the control path from the client VNIC driver in the first client partition to the target network using the backup virtual function.

3. The method of claim 2,
    wherein receiving the failure alert indicating that the control path from the client VNIC driver in the first client partition to the target network using the active virtual function has failed comprises determining that the control path has failed due to a software malfunction; and
    wherein selecting, from the virtual function pool, the backup virtual function for the first client partition based on the failure alert comprises determining that the backup virtual function and the active virtual function are associated with a same physical port on a same SR-IOV adapter.

4. The method of claim 2,
    wherein receiving the failure alert indicating that the control path from the client VNIC driver in the first client partition to the target network using the active virtual function has failed comprises determining that the control path has failed due to a hardware malfunction; and
    wherein selecting, from the virtual function pool, the backup virtual function for the first client partition based on the failure alert comprises determining that the backup virtual function and the active virtual function are associated with different physical ports.

5. The method of claim 2,
    wherein receiving the failure alert indicating that the control path from the client VNIC driver in the first client partition to the target network using the active virtual function has failed comprises determining that the control path has failed due to a change in traffic patterns; and
    wherein selecting, from the virtual function pool, the backup virtual function for the first client partition based on the failure alert comprises determining that the backup virtual function provides greater throughput than the active virtual function.

6. The method of claim 2, further comprising:
    adding an additional virtual function to the virtual function pool in response to receiving, from a hardware management console, a description of the additional virtual function to add to the virtual function pool;
    determining that the additional virtual function provides greater throughput for the control path from the client VNIC driver in the first client partition to the target network; and
    recreating the control path from the client VNIC driver in the first client partition to the target network using the additional virtual function.

7. The method of claim 2,
    wherein the failure alert further indicates that a control path for a second client partition has failed; and
    wherein selecting, from the virtual function pool, the backup virtual function for the first client partition based on the failure alert comprises selecting, from the virtual function pool, a backup virtual function for the second client partition based on the failure alert.

8. An apparatus for managing a pool of virtual functions, the apparatus comprising a computer processor, a computer memory operatively coupled to the computer processor, the computer memory having disposed within it computer program instructions that, when executed by the computer processor, cause the apparatus to carry out the steps of:
    receiving a fault tolerance information for one or more connections to a network;
    identifying available virtual functions; and
    determining, from the available virtual functions in dependence upon the fault tolerance information, a virtual function pool comprising a plurality of virtual functions for at least one single root input/output virtualization (SR-IOV) adapter, wherein the fault tolerance information specifies failures to accommodate without loss of access by the plurality of virtual functions.

9. The apparatus of claim 8, wherein the computer program instructions further cause the apparatus to carry out the steps of:
creating a control path from a client virtual network interface controller (VNIC) driver in a first client partition to a target network using an active virtual function, wherein the active virtual function is selected from the virtual function pool;
receiving a failure alert indicating that the control path from the client VNIC driver in the first client partition to the target network using the active virtual function has failed;
selecting, from the virtual function pool, a backup virtual function for the first client partition based on the failure alert; and
recreating the control path from the client VNIC driver in the first client partition to the target network using the backup virtual function.

10. The apparatus of claim 9,
wherein receiving the failure alert indicating that the control path from the client VNIC driver in the first client partition to the target network using the active virtual function has failed comprises determining that the control path has failed due to at least one of a hardware malfunction and a software malfunction; and
wherein selecting, from the virtual function pool, the backup virtual function for the first client partition based on the failure alert comprises determining that the backup virtual function and the active virtual function are associated with a same physical port on a same SR-IOV adapter.

11. The apparatus of claim 9,
wherein receiving the failure alert indicating that the control path from the client VNIC driver in the first client partition to the target network using the active virtual function has failed comprises determining that the control path has failed due to a change in traffic patterns; and
wherein selecting, from the virtual function pool, the backup virtual function for the first client partition based on the failure alert comprises determining that the backup virtual function provides greater throughput than the active virtual function.

12. The apparatus of claim 9, wherein the computer program instructions further cause the apparatus to carry out the steps of:
adding an additional virtual function to the virtual function pool in response to receiving, from a hardware management console, a description of the additional virtual function to add to the virtual function pool;
determining that the additional virtual function provides greater throughput for the control path from the client VNIC driver in the first client partition to the target network; and
recreating the control path from the client VNIC driver in the first client partition to the target network using the additional virtual function.

13. The apparatus of claim 9,
wherein the failure alert further indicates that a control path for a second client partition has failed; and wherein selecting, from the virtual function pool, the backup virtual function for the first client partition based on the failure alert comprises selecting, from the virtual function pool, a backup virtual function for the second client partition based on the failure alert.

14. The apparatus of claim 9,
wherein the failure alert further indicates that a threshold number of control paths have failed; and
wherein selecting, from the virtual function pool, the backup virtual function for the first client partition based on the failure alert comprises selecting, from the virtual function pool, a backup virtual function for each of the threshold number of control paths, and wherein each backup virtual function provides a minimum amount of throughput for each of the client partitions.

15. A computer program product for managing a pool of virtual functions, the computer program product disposed upon a non-transitory computer readable storage medium, the computer program product comprising computer program instructions that, when executed, cause a computer to carry out the steps of:
receiving a fault tolerance information for one or more connections to a network;
identifying available virtual functions; and
determining, from the available virtual functions in dependence upon the fault tolerance information, a virtual function pool comprising a plurality of virtual functions for at least one single root input/output virtualization (SR-IOV) adapter, wherein the fault tolerance information specifies failures to accommodate without loss of access by the plurality of virtual functions.

16. The computer program product of claim 15, wherein the computer program instructions further cause the computer to carry out the steps of:
creating a control path from a client virtual network interface controller (VNIC) driver in a first client partition to a target network using an active virtual function, wherein the active virtual function is selected from the virtual function pool;
receiving a failure alert indicating that the control path from the client VNIC driver in the first client partition to the target network using the active virtual function has failed;
selecting, from the virtual function pool, a backup virtual function for the first client partition based on the failure alert; and
recreating the control path from the client VNIC driver in the first client partition to the target network using the backup virtual function.

17. The computer program product of claim 16,
wherein receiving the failure alert indicating that the control path from the client VNIC driver in the first client partition to the target network using the active virtual function has failed comprises determining that the control path has failed due to at least one of a hardware malfunction and a software malfunction; and
wherein selecting, from the virtual function pool, the backup virtual function for the first client partition based on the failure alert comprises determining that the backup virtual function and the active virtual function are associated with a same physical port on a same SR-IOV adapter.

18. The computer program product of claim 16,
wherein receiving the failure alert indicating that the control path from the client VNIC driver in the first client partition to the target network using the active virtual function has failed comprises determining that the control path has failed due to a change in traffic patterns; and wherein selecting, from the virtual function pool, the backup virtual function for the first client partition based on the failure alert comprises determining that the backup virtual function provides greater throughput than the active virtual function.

19. The computer program product of claim 16, wherein the computer program instructions further cause the computer to carry out the steps of:

adding an additional virtual function to the virtual function pool in response to receiving, from a hardware management console, a description of the additional virtual function to add to the virtual function pool;

determining that the additional virtual function provides greater throughput for the control path from the client VNIC driver in the first client partition to the target network; and recreating the control path from the client VNIC driver in the first client partition to the target network using the additional virtual function.

20. The computer program product of claim 16, wherein the failure alert further indicates that a control path for a second client partition has failed; and wherein selecting, from the virtual function pool, the backup virtual function for the first client partition based on the failure alert comprises selecting, from the virtual function pool, a backup virtual function for the second client partition based on the failure alert.

* * * * *